United States Patent [19]

Firey

[11] Patent Number: 5,485,812
[45] Date of Patent: Jan. 23, 1996

[54] MULTIPLE SOURCES REFUEL MECHANISM

[76] Inventor: Joseph C. Firey, P.O. Box 15514, Seattle, Wash. 98115-0514

[21] Appl. No.: 378,639

[22] Filed: Jan. 26, 1995

[51] Int. Cl.$^6$ ..................................................... F02B 45/00
[52] U.S. Cl. ........................... 123/23; 110/108; 222/134; 222/136; 222/252; 222/363
[58] Field of Search ............................... 123/23; 110/108, 110/109; 222/134, 136, 216, 252, 254, 363

[56] References Cited

U.S. PATENT DOCUMENTS 3,233,790  3/1966  Shichizaemon et al. ............... 222/254
3,981,277  9/1976  Abom ........................................ 123/23

FOREIGN PATENT DOCUMENTS 3212986  10/1983  Germany ................................. 123/23

Primary Examiner—Noah P. Kamen

[57] ABSTRACT

A refuel mechanism for refueling solids into a reaction chamber, operating at pressure, is described which is capable of premixing several different solid materials before inserting these premixed materials into the reaction chamber. A number of hoppers, containing the differing solid materials, feed these solids together, via proportioning and transfer apparatus, into premixers. The final premix of the several differing solids is then inserted into the pressurized reactor by a refuel mechanism.

4 Claims, 4 Drawing Sheets

MULTIPLE SOURCES REFUEL MECHANISM

CROSS REFERENCES TO RELATED APPLICATIONS

The invention described in this application is related to and usable on the invention described in my US Patent application entitled, Combined Reactor for Cyclic Char Burning Engines, Ser. No. 08/379914, filed Jan. 30, 1995. These two related applications are being sent in to the US Patent Office at about the same time.

BACKGROUND OF THE INVENTION

1. Field of the Invention

This invention is in the field of refuel mechanisms for adding solid fuel and other solid reactants into reaction chambers which are operating at high pressures. Reaction chambers for cyclic char burning engines and cyclic velox boilers are examples of such high pressure reaction chambers.

2. Description of the Prior Art

Examples of prior art refuel mechanisms and high pressure reaction chambers as used on cyclic char burning engines and cyclic velox boilers are described in my following U.S. Patents:

1. U.S. Pat. No. 4,412,511; *Char and Oil Burning Engine;*
2. U.S. Pat. No. 4,653,436; *Untimed Refuel and Ash Removal for Char Burning Engines;*
3. U.S. Pat. No. 4,455,837; *Cyclic Velox Boiler;*
4. U.S. Pat. No. 4,372,,256; *Char Burning Free Piston Gas Generator;*

This material is incorporated herein by reference thereto. All of these prior art refuel mechanisms transferred a single solid material, from a single source of refuel materials, into the high pressure reaction chamber. In some applications of cyclic char burning engines and cyclic velox boilers it would be desirable to be able to transfer two or more differing solid refuel materials into the high pressure reaction chamber, and to vary the relative proportions of these differing refuel materials thusly being refueled. For example, where char fuels high in sulfur or nitrogen content are being reacted, addition of basic solid materials such as limestone, to the material being refueled, may be desired in order to capture the resultant acid rain components. Preferably the relative proportions of limestone to char fuel should be adjustable, while the reaction chamber is operating, in order to compensate for changes in char fuel composition and reaction chamber operating conditions.

SUMMARY OF THE INVENTION

The multiple sources refuel mechanisms of this invention comprise, one or more blenders for premixing two separate refuel materials in adjustable proportions, and a refuel mechanism which inserts final premixed refuel material, at intervals, into the high pressure reaction chamber, and maintains a compressive force on the reaction chamber contents at all times, except when such inserting of refuel materials is taking place. Each such blender comprises, a proportioner for proportioning the ratio of two separate refuel materials, a mixer for mixing these materials together, a hopper for receiving these premixed refuel materials, and a transfer means for transferring the two separate materials from sources to receiving hopper via the proportioner and mixer. A final receiving hopper receives premixed refuel material containing portions from each of the multiple sources, and supplies this final premixed refuel material to the refuel mechanism for insertion into the reaction chamber. In this way, two or more refuel materials can be supplied to the reaction chamber, and in differing relative proportions, in order to improve reaction chamber performance in various ways. For example undesirable reaction chamber emissions of :acid rain components can be reduced by premixing limestone with char fuel being refueled into char burning engine reaction chambers. Secondary producer gas burning speeds can be increased by premixing char fuels containing hydrocarbon materials with separate low volatile matter char fuels being refueled into cyclic velox boiler reaction chambers. These are examples of beneficial objects achievable by use of the devices of this invention.

BRIEF DESCRIPTION OF THE DRAWINGS

A schematic diagram of the use of a two sources form of this invention with a cyclic char burning engine is shown in FIG. 1.

An example refuel mechanism portion of this invention is shown in FIG. 2 as connected to a reaction chamber.

Figure 3:
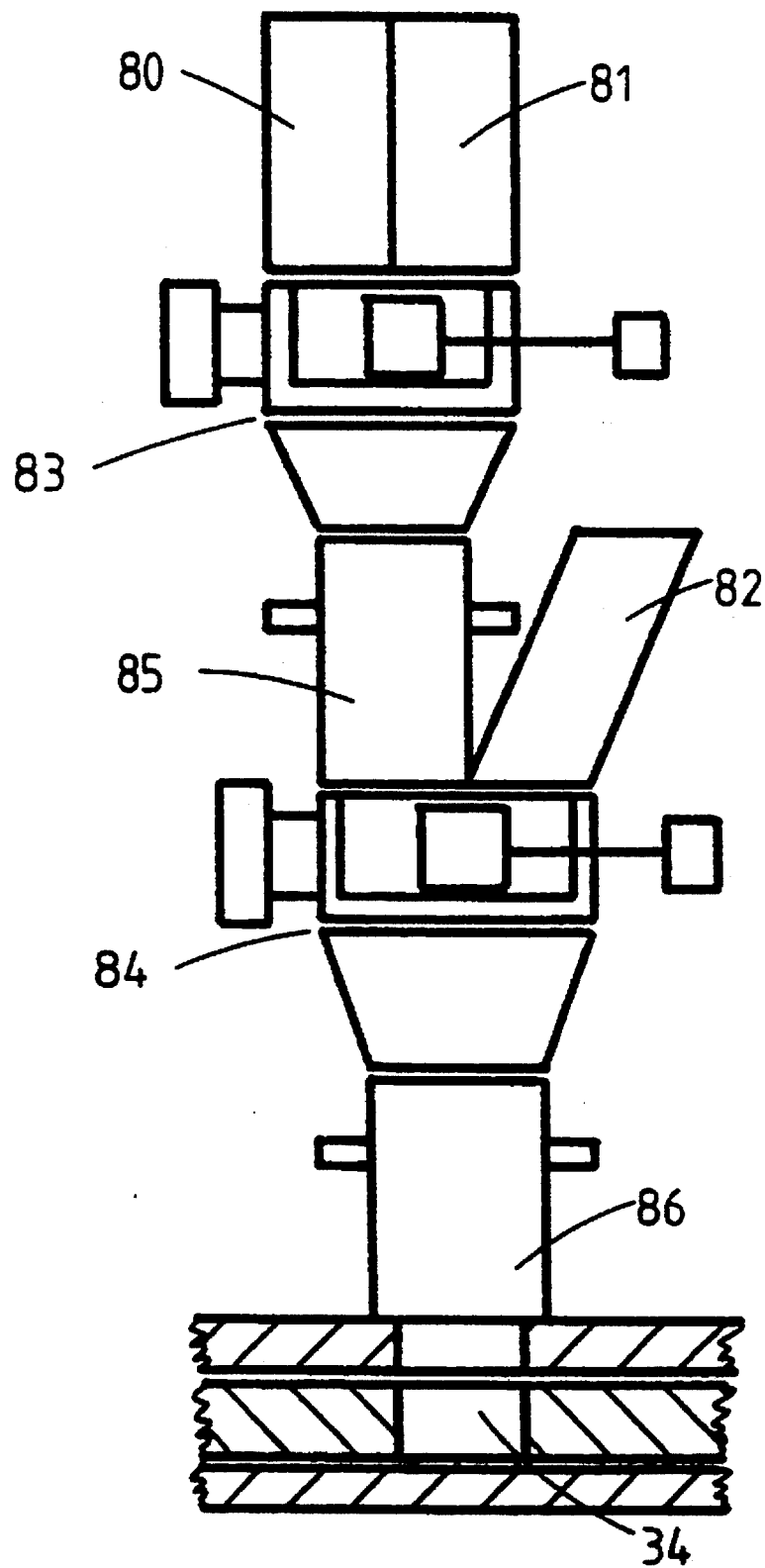

A three sources form of this invention is shown schematically in FIG. 3.

Figure 4A:
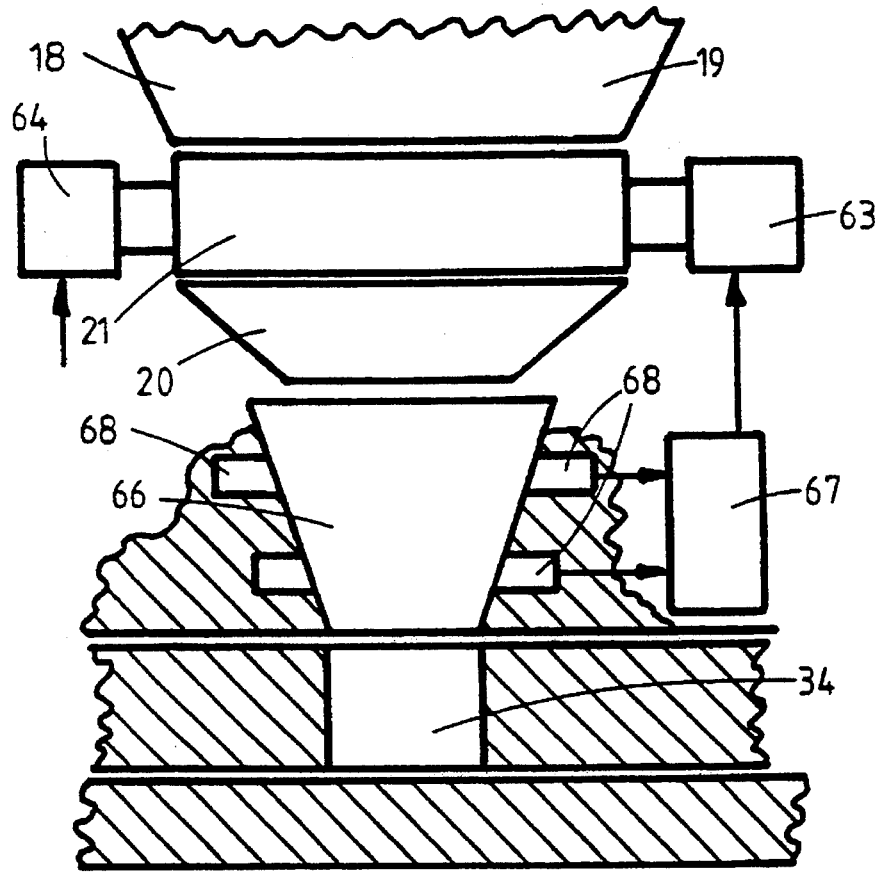
Figure 4B:
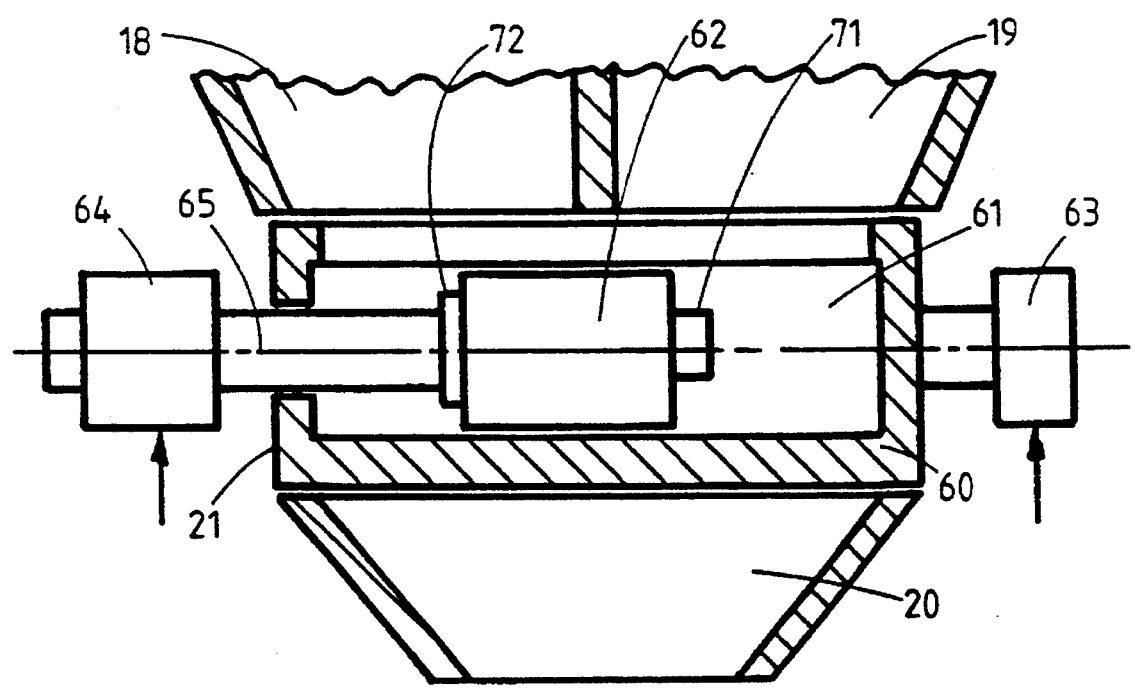

Details of an example blender means portion of this invention are shown in FIG. 4A and FIG. 4B.

DESCRIPTION OF THE PREFERRED EMBODIMENTS

The multiple solids sources refuel mechanisms of this invention provide apparatus for premixing several different solid refuel materials together, in adjustable proportions, before inserting the final premixed refuel material into a reaction chamber operating at high pressure. Refueling apparatus of this invention can be used with cyclic char burning engines and cyclic velox boilers, such as me described in the referenced patents, in order to reduce emissions of acid rain components, and to improve reaction chamber combustion properties.

Figure 1:
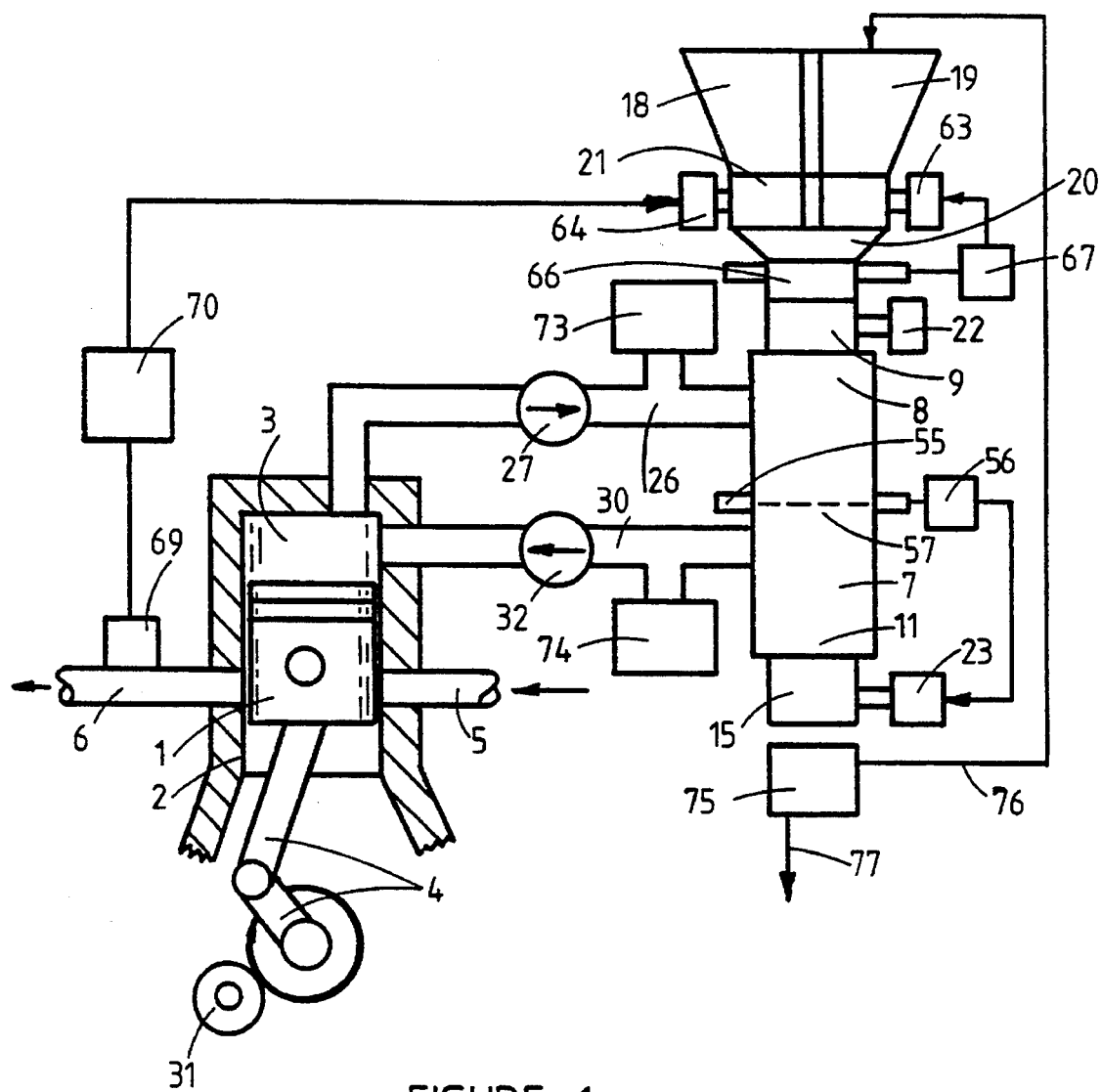
Figure 2:
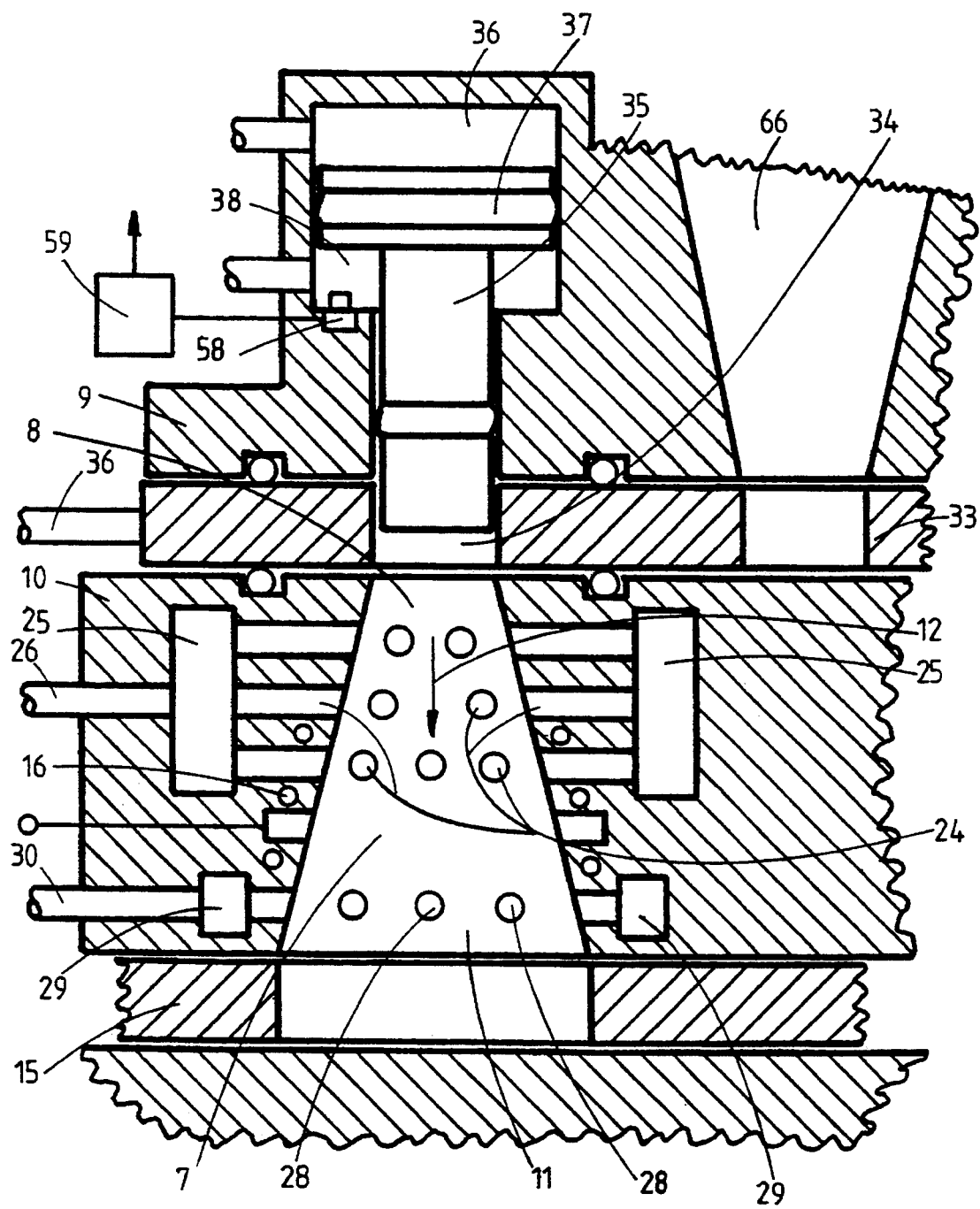

A particular example form of this invention, comprising two separate sources of solid refuel materials to be premixed, is shown schematically in FIG. 1 as used with a cyclic char burning engine and comprises:

A. The cyclic char:burning engine comprises

1. The combined apparatus for compressing and expanding gases comprising: a piston, 1; operative within a cylinder, 2; and these enclosing a variable volume chamber, 3; whose volume varies cyclically as the piston is reciprocated by a driver, 4. The driver, 4, reciprocates the piston, 1, thus varying the volume of the variable volume chamber, 3. The combined apparatus for compressing and expanding shown in FIG. 1 further comprises: an intake means, 5, for placing air as reactant gas into the variable volume chamber, 3, prior to each compression process when the piston, 1, is at the bottom portion of its stroke; an exhaust apparatus, 6, for removing reacted gases from the variable volume chamber, 3, after each expansion process when the piston, 1, is again at the bottom portion of its stroke. A two stroke cycle internal combustion engine mechanism is shown in FIG. 1 but four stroke cycle internal combustion engine mechanisms can also be used.

2. A separated primary reaction chamber, 7, contains char fuel which is added into the refuel end, 8, thereof by a refuel mechanism, 9, and this primary reactor comprises; a pressure vessel container, 10, to contain the primary reaction chamber, 7; an ash collection end, 11; a char fuel direction of motion, 12, from the refuel end, 8, toward the ash collection end, 11, in which direction the char fuel moves as it is being reacted and consumed within the primary reactor, 7; an ash removal mechanism, 15, which removes ashes from the ash collection end, 11, of the primary reactor, 7; a starting heater, 16, for preheating the char fuel in the primary reactor, 7, up to that temperature at which it reacts rapidly with oxygen in adjacent compressed reactant gas when the engine is being cranked for starting, by the cranking apparatus, 31.

B. The devices of this invention comprise additions to and modifications of the primary reaction chamber, 7, and an example is shown in FIGS. 1, 2, 4A and 4B as follows:

3. Two separate sources of solid refuel materials are contained in hoppers, a source of char fuel chunks, 18, and a source of porous ceramic chips, 19.

4. A blender for proportioning, transferring and mixing the char fuel chunks and the porous ceramic chips together is connected at inlet to the char fuel and ceramic chips sources, 18, 19, and is connected at outlet to the refuel mechanism, 9.

5. Each blender comprises:
   a. A proportioner, 62, for proportioning the volumetric ratio of char fuel to ceramic chips, further comprises apparatus for adjusting, 64, this volumetric ratio by moving the proportioner block, 62, relative to the two sources, 18 and 19, The char fuel source, 18, and the ceramic chips source, 19, feed these materials into the transfer valve, 60, whose cavity volume, 61, is fitted with a moveable block, 62, of fixed size. Rotating the transfer valve, 60, about its centerline, 65, as by the drive apparatus, 63 or by hand, transfers a volume of material from the sources, 18, 19, into the mixer, 20, where the transferred particles mix together. The volume thus transferred on each rotation of the valve, 60, is constant since the volume of the cavity, 61, and the moveable block, 62, are constant. But the relative volumes of ceramic chips to char fuel chunks can be changed by moving the block, 62, within the cavity, 61. When the block, 62, is largely beneath the ceramic chips source, 19, a small volume of ceramic chips is transferred together with a large volume of char fuel, thus creating a low value of the volumetric ratio of ceramic chips to char fuel. A high value of the volumetric ratio of ceramic chips to char fuel results similarly with the moveable block, 62, is largely beneath the char fuel source, 18. The position of the block, 62, within the cavity, 61, can be adjusted via the block driver, 64, as by hand, or preferably automatically.
   b. A mixer, 20, premixes the proportioned char fuel and ceramic chips passing through the mixer.
   c. A receiving hopper, 66, receives the final premixed and proportioned char fuel and ceramic chips, and connects at outlet to the refuel mechanism, 9,
   d. A transfer apparatus, 21, transfers the char fuel and ceramic chips from the sources, 18 and 19, into the receiving hopper, 66, via the proportioner, 62, and the mixer, 20, and comprises a transfer drive apparatus, 63, which rotates the transfer valve, 60, about its axis, 65, when transfer is to take place.

6. The refuel mechanism, 9, is modified to comprise apparatus for inserting char fuel chunks and porous ceramic chips together into the refuel end, 8, of the primary reaction chamber, 7, from the blender. The refuel mechanism, 9, has a refuel drive apparatus, 22, for driving the apparatus for inserting so that refueling occurs periodically over a refuel process time interval, and so that a compressive force is applied to the contents of the primary reaction chamber, 7, at all times except during the refuel process time interval. By thus maintaining a compression force on the reaction chamber contents, these are prevented from bouncing and thus creating fines, which could carry over into the variable volume chamber, 3, and create wear and deposit problems. One particular example of a refuel mechanism, suitable for use with this invention, is partially shown in FIG. 2, and comprises:

A transfer plate, 33, with at least one refuel cavity, 34, is driven back and forth via the drive bar, 36, by the refuel mechanism driving apparatus, 22, so that the refuel cavity, 34, is aligned to both the refuel driver piston, 35, and the refuel end, 8, of the primary reaction chamber, 7, at all times except during a refuel process time interval. The refuel driver piston, 35, applies a continuous compressive force on the contents of the refuel cavity, 34, and thence on the contents of the primary reaction chamber, 7, by application of pressure to the drive side, 36, of the actuator piston, 37. During each refuel process time interval the refuel driver piston, 35, is retracted outside the refuel cavity, 34, by application of pressure 10 the retract side, 38, of the actuator piston, 37, and the refuel cavity is moved by the drive bar, 36, and drive apparatus, 22, into alignment with the blender receiving hopper, 66, to be refilled with fresh final premixed char fuel and ceramic chips. After refilling the refuel cavity, 34, is moved back into alignment with the refuel driver piston, 35, and the compressive force is reapplied.

7. In this way the two separate refuel source materials, contained in the two hoppers, 18, 19, are mixed together in adjustable proportions, and the resulting final premixed refuel material is inserted into the reaction chamber, 7. The contents of the reaction chamber, 7, are kept under a constant compressive force except when premixed refuel material is being inserted into the reaction chamber.

8. One particular example of a beneficial object achievable by use of this invention is to reduce reaction chamber emissions of acid rain components such as sulfur and nitrogen oxides formed from char fuels containing sulfur and nitrogen, by mixing porous basic ceramic chips, such as limestone, in with the char fuel being refueled into the reaction chamber. The basic limestone captures the sulfur and nitrogen oxides within the reaction chamber and thus prevents their emission.

C. Adjustment of the volumetric proportions of the separate refuel source materials to be premixed, can be done by hand adjustment of the proportioner block drive, 64, but automatic adjustment will frequently be preferred. For example, the char burning engine exhaust gas content of sulfur and nitrogen acid emissions could be sensed by a suitable sensor, 69, which acted via a controller, 70, to adjust the block drive, 64, so that the final premixed refuel material contained an increased proportion of basic limestone whenever the acid emissions exceeded a set content.

D. Operation of the transfer valve, 60, by the transfer drive apparatus, 63, can also be accomplished by hand in order to keep the receiving hopper, 66, filled to a set level. Preferably, however, the receiving hopper is automatically kept thusly filled to a set level. For example, hopper level sensors, 68, can act via a controller 67, to operate the transfer drive apparatus, 63, to rotate the transfer valve, 60, whenever the level of premixed refuel material drops below a set level in the receiving hopper, 66.

E. Reactions within the reaction chamber cause a reduction in the contents thereof which are to be refilled by action of the refuel driver piston, 35, forcing fresh final premixed refuel materials out of the refuel cavity, 34, and into the refuel end, 8, of the reaction chamber, 7. When the refuel drive piston, 37, reaches the end of its delivery stroke, a refuel process can be initiated, as for example by a stroke end sensor, 58, and refuel controller, 59, acting on the refuel drive apparatus, 22. Following the refuel process the refuel cavity, 34, will have been refilled from the receiving hopper, 66, and have been returned into alignment with the refuel driver piston, 37, and the refuel end, 8, of the primary reaction chamber, 7. In this way the reaction chamber can be kept filled to a set volume and the contents kept under a compressive load at all times except during a refuel process. This automatic operation of the refuel mechanism will usually be preferred, but hand initiation of each refuel process can alternatively be used.

The example form of this invention shown in FIGS. 1, 2, 4A and 4B and described hereinabove, comprises two separate refuel source materials to be premixed together to form the final premixed refuel material. Other forms of this invention may comprise more than two separate refuel source materials to be premixed together.

An example of a multiple sources refuel mechanism, using three separate sources of refuel materials, is shown schematically in FIG. 3 and comprises:

1. Three separate primary sources of refuel materials, 80, 81, 82 in hoppers;
2. A first blender, 83, receiving refuel material form source hoppers, 80 and 81, and transferring first premixed refuel material into first receiving hopper, 85;
3. A second blender, 84, receiving refuel material from source hopper, 82, and first receiving hopper, 85, and transferring final premixed refuel material into final receiving hopper, 86;
4. Only a small portion, 34, of the refuel mechanism for inserting is shown in FIG. 3 as receiving final premixed refuel material from the second blender, 84, via its final receiving hopper, 86.

An example application for such a three source refuel mechanism could be a char burning engine, or cyclic velox boiler, burning a char fuel containing large amounts of both sulfur and nitrogen. Two different basic ceramic materials might be advantageously premixed into this char fuel, a first basic ceramic best suited for capture of sulfur acid components, and a second basic ceramic best suited for capture of nitrogen acid components. As the char fuel content of sulfur and nitrogen varied, the relative proportions of these two different basic ceramic materials could be adjusted accordingly in order to minimize overall emissions of acid rain components.

What I claim is:

1. A multiple solids sources refuel means for creating a single final premixed refuel material, containing portions from each of said multiple sources, and for inserting said final premixed refuel material into a reaction chamber, and comprising:

at least two separate primary sources of refuel materials contained in separate source hoppers and each said source hopper comprising an outlet;

at least one blender means for proportioning, transferring, and mixing two separate refuel materials, each said blender means comprising;

a blender inlet for two separate refuel materials to be premixed;

proportioner means for proportioning the volumetric ratio of two separate refuel materials, and comprising means for adjusting said volumetric ratio;

mixer means for mixing two separate refuel materials together to create a single premixed refuel material;

a receiving hopper for receiving and containing premixed refuel materials and comprising an outlet;

transfer means for transferring refuel materials from said blender inlet into said receiving hopper through said proportioner means followed by said mixer means, and comprising transfer drive means for driving said transfer means;

said inlet of each said blender means being connected to the outlet of two hoppers for containing refuel materials;

a refuel mechanism means for inserting refuel materials into said reaction chamber, and comprising refuel drive means for driving said means for inserting and adapted to carry out said insertion over a refuel process time interval, and adapted to apply a compression force to the contents of said reaction chamber, at all times when said reaction chamber is operating except during said refuel process time interval, said refuel mechanism means comprising an inlet for refuel materials;

that one final receiving hopper, containing solid materials from all of said at least two separate primary sources of refuel materials, being connected, via its outlet, to the inlet of said refuel mechanism means for inserting materials;

each said source and receiving hopper containing refuel materials, except said one final receiving hopper, being connected via its outlet to the blender inlet of one of said blender means.

2. A multiple solids sources refuel means for creating a single final premixed refuel material, as described in claim 1;

wherein each said receiving hopper of each said blender means further comprises:

hopper level sensor means for sensing the level of refuel materials in said hopper;

and further comprising:

level control means for controlling said transfer drive means of said blender means, responsive to said hopper level sensor means and operative upon said transfer drive means, so that said hopper always contains some refuel material, whenever said multiple solids sources refuel means is operating.

3. A multiple solids sources refuel means for creating a single final premixed refuel material, as described in claim 1;

wherein said reaction chamber further comprises a reactor contents sensor means for sensing the quantity of materials within said reaction chamber;

and further comprising:

refuel control means for controlling said refuel drive means, responsive to said reactor contents sensor means and operative upon said refuel drive means, so that a refuel insertion process takes place whenever said reactor contents decrease below a set volume.

4. A multiple solids sources refuel means for creating a single final premixed refuel material, as described in claim 1;

wherein said reaction chamber further comprises reaction chamber output product composition sensor means for sensing the composition of the reaction chamber output product;

wherein each said blender means further comprises proportioner control means for controlling the volumetric ratio of said two separate refuel materials to be premixed, responsive to said reaction chamber output product composition sensor means and operative upon said means for adjusting said volumetric ratio of said two separate refuel materials, so that said reaction chamber output product composition remains within set limits.

* * * * *